E. ROOD.
Plows.

No. 134,316. Patented Dec. 24, 1872.

Witnesses.
O. H. Gilbert
Deloss Williams

Inventor.
Erastus Rood

UNITED STATES PATENT OFFICE.

ERASTUS ROOD, OF DARIEN, WISCONSIN.

IMPROVEMENT IN PLOWS.

Specification forming part of Letters Patent No. 134,316, dated December 24, 1872.

*To all whom it may concern:*

Be it known that I, ERASTUS ROOD, of the town of Darien, county of Walworth and State of Wisconsin, have invented certain new and useful Improvements in Plows; and do hereby declare that the following is a full, clear, and exact description thereof, reference being had to the accompanying drawing forming a part of this specification.

The nature of my invention consists in the construction of a frame supported upon wheels, and to which one or a series of plow-beams are secured, said frame being so constructed as to allow the beams to be raised or lowered on one or both sides of the frame, so that the depth of the plows can be easily adjusted, and the plows held level while one wheel is running in the furrow and the other on the landside, all as more fully hereinafter set forth.

Figure 1:
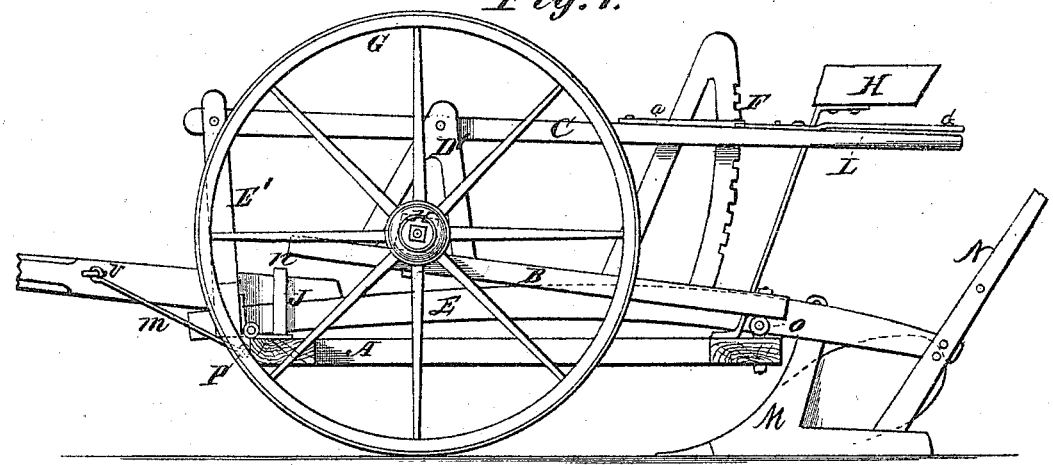
Figure 2:
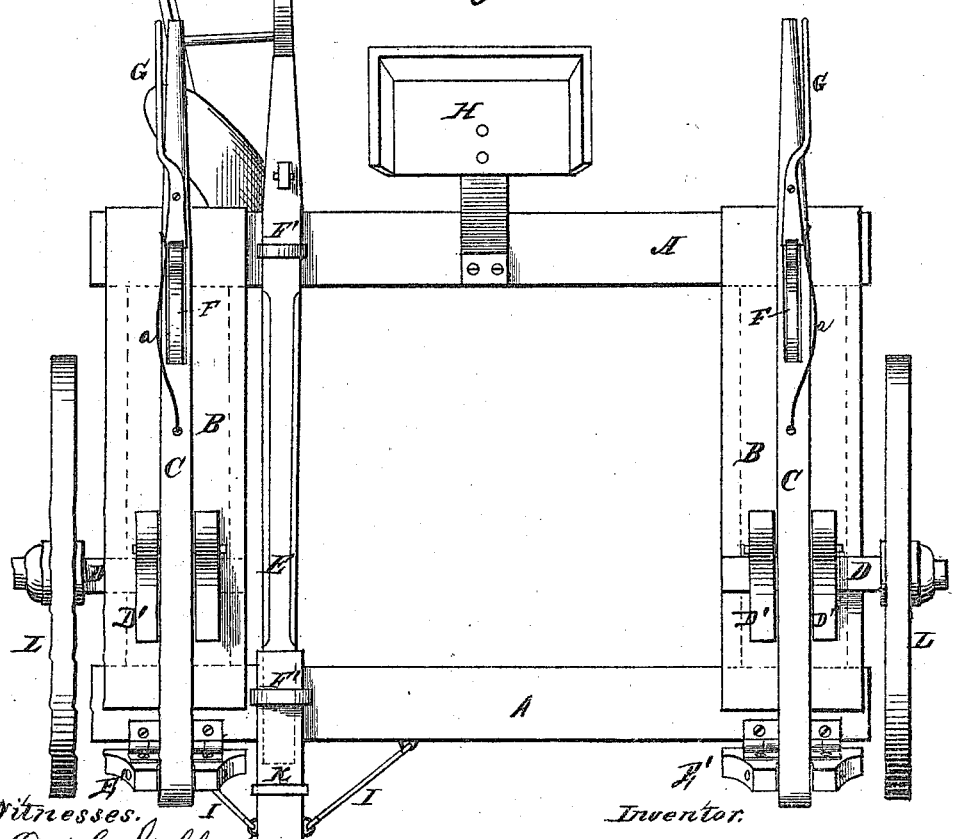

Figure 1 represents a side elevation, and Fig. 2 a plan view.

A represents a rectangular frame, and above each side piece of the frame, near the wheels, is a hinged board, B. Near the front of each board B is a short axle, D, attached to either the under or top side of the same. To each axle D is secured a wheel, L. Each of the boards B is connected to the rear cross-piece of the frame A by a hinge, O, as seen in Fig. 1. Upon the front cross-piece of the frame, directly forward of each board B, is a forked vertical standard, E', which is connected to the frame by a hinge to allow a slight forward or rearward action, as will be hereinafter described. D' represents a standard on the forward part of each board B, and F represents a curved and notched plate on the rear part of each board B. Pivoted between each standard E', and between the standards D', is a long lever, C, provided with an oblong slot, through which passes the notched plate F. Upon the top of each lever is a pivoted catch, G, and spring a, as shown. H represents the driver's seat. E represents the beam of an ordinary plow, to which are attached the plow M and handles N. The beam is laid upon the frame A, and held in place by keepers F' F', or other suitable devices.

One or more plow-beams may be thus attached to the frame near each board B, and by raising or lowering the lever C the frame and plow are elevated or depressed, as required, so as to give the plow a distance to or from the earth, and allow a shallow or deep furrow to be made, as desired. By having one hinged board, lever, &c., on each side of the frame, either side can be raised or lowered without interrupting the opposite side.

K represents the tongue of the wagon, which is braced by the rods I I.

Having thus described my invention, what I claim is—

The combination of the frame A, hinged boards B B, notched plates F F, standards D' and E', slotted levers C, wheels L L, and one or more plows, E M, all constructed and arranged substantially as set forth.

ERASTUS ROOD.

Witnesses:
    O. H. GILBERT,
    DELOSS WILLIAMS.